US012712959B2

(12) United States Patent
Wang et al.

(10) Patent No.: US 12,712,959 B2
(45) Date of Patent: Aug. 18, 2026

(54) PORT FRAME, MIDDLE FRAME COMPONENT, AND ELECTRONIC DEVICE

(71) Applicant: Honor Device Co., Ltd., Shenzhen (CN)

(72) Inventors: Chenyu Wang, Shenzhen (CN); Ya Wang, Shenzhen (CN); Kuibing Zhao, Shenzhen (CN); Wenxing Yao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 85 days.

(21) Appl. No.: 18/869,596

(22) PCT Filed: Aug. 2, 2023

(86) PCT No.: PCT/CN2023/110769
§ 371 (c)(1),
(2) Date: Nov. 26, 2024

(87) PCT Pub. No.: WO2024/152545
PCT Pub. Date: Jul. 25, 2024

(65) Prior Publication Data

US 2025/0350675 A1 Nov. 13, 2025

(30) Foreign Application Priority Data

Jan. 18, 2023 (CN) ........................ 202320170243.4

(51) Int. Cl.
*H04M 1/02* (2006.01)

(52) U.S. Cl.
CPC ....... *H04M 1/0274* (2013.01); *H04M 1/0249* (2013.01)

(58) Field of Classification Search
CPC combination set(s) only.
See application file for complete search history.

(56) References Cited

U.S. PATENT DOCUMENTS 6,718,408 B2 * 4/2004 Esterberg ............. G06F 1/1632 710/63
7,382,612 B2 * 6/2008 Chan ..................... G06F 1/1616 361/679.41

(Continued)

FOREIGN PATENT DOCUMENTS

CN 108879194 A 11/2018
CN 109202085 A 1/2019

(Continued)

*Primary Examiner* — Lisa Lea-Edmonds
(74) *Attorney, Agent, or Firm* — Slater Matsil, LLP

(57) ABSTRACT

This application provides a port frame, a middle frame component, and an electronic device. The port frame includes a frame body, a connection bump, and a positioning structure. A frame hole is formed on the frame body, the frame body has a frame surface, and the frame surface is configured to come into contact with a first middle frame surface. The frame body may be formed through injection molding of metal powder, to improve structural strength. The connection bump is connected to the frame body, the connection bump has a connection surface that forms an included angle with the frame surface, the connection surface is configured to come into contact with a second middle frame surface, and the connection bump is fixedly connected to the middle frame body, and is electrically connected to both the frame body and the middle frame body.

20 Claims, 4 Drawing Sheets

(56) References Cited

U.S. PATENT DOCUMENTS

| | | | | |
|---|---|---|---|---|
| 9,713,274 | B2 * | 7/2017 | Takayuki | H05K 7/142 |
| 10,491,257 | B2 * | 11/2019 | Cha | H04M 1/18 |
| 11,942,717 | B2 * | 3/2024 | Liu | H01R 13/6581 |
| 12,470,647 | B2 * | 11/2025 | Wang | G06F 1/1698 |
| 2009/0190321 | A1 * | 7/2009 | Yamazaki | H05K 9/0032 361/818 |
| 2022/0407990 | A1 * | 12/2022 | Dong | F16M 13/02 |
| 2024/0015896 | A1 | 1/2024 | Wang et al. | |
| 2024/0129395 | A1 * | 4/2024 | Wang | G06F 1/1698 |
| 2025/0350675 | A1 * | 11/2025 | Wang | H04M 1/0274 |
| 2025/0358354 | A1 * | 11/2025 | Ping | H04M 1/026 |

FOREIGN PATENT DOCUMENTS

| | | | |
|---|---|---|---|
| CN | 111629090 | A | 9/2020 |
| CN | 113245790 | A | 8/2021 |
| CN | 114375115 | A | 4/2022 |
| CN | 114828500 | A | 7/2022 |
| CN | 115580998 | A | 1/2023 |
| KR | 202200110028 | A | 8/2022 |

* cited by examiner

PORT FRAME, MIDDLE FRAME COMPONENT, AND ELECTRONIC DEVICE

CROSS-REFERENCE TO RELATED APPLICATIONS

This application is a National Stage of International Application No. PCT/CN2023/110769, filed on Aug. 2, 2023, which claims priority to Chinese Patent Application No. 202320170243.4, filed on Jan. 18, 2023, both of which are hereby incorporated by reference in their entireties.

TECHNICAL FIELD

This application relates to the field of a middle frame of a mobile phone, and in particular, to a port frame, a middle frame component, and an electronic device.

BACKGROUND

As a new breakthrough of a high-end mobile phone, a foldable-screen mobile phone is being accepted by increasingly more consumers due to advantages such as a larger screen, a more flexible viewing angle, more diversified use experience, and higher office efficiency, and gradually becomes a new trend.

A middle frame component of the foldable-screen mobile phone includes a middle frame body and a port frame, and a USB plug may be inserted into a frame hole enclosed by the port frame, so that the USB plug is electrically connected to a motherboard in the foldable-screen mobile phone. Currently, the middle frame component is usually disposed through integral injection molding of the middle frame body and the port frame, to facilitate processing. However, with diversity of functions of the foldable-screen mobile phone, to implement some functions of the port frame, the port frame usually needs to be separately processed, and then the port frame and the middle frame body are assembled. However, in this way, a problem of a large connection error between the port frame and the middle frame body is easily caused, and subsequent processing and alignment are affected.

SUMMARY

This application provides a port frame, a middle frame component, and an electronic device, to resolve a problem that a connection error between an existing port frame and a middle frame body is relatively large when the port frame is separately processed.

To achieve the foregoing objective, the following technical solutions are used in this application:

According to a first aspect, a port frame is provided, and is configured to be fixedly connected to a middle frame body of an electronic device. The middle frame body has a first middle frame surface and a second middle frame surface disposed with an included angle therebetween, and the port frame includes a frame body and at least one connection bump. A frame hole is formed on the frame body, the frame body has a frame surface, and the frame surface is configured to come into contact with the first middle frame surface. The connection bump is connected to the frame body, the connection bump has a connection surface that forms an included angle with the frame surface, and the connection surface is configured to come into contact with the second middle frame surface. The connection bump is fixedly connected to the middle frame body and is electrically connected to both the frame body and the middle frame body. The port frame is aligned with the middle frame body through contact between the frame surface and the first middle frame surface and contact between the connection surface and the second middle frame surface. Therefore, a connection error caused when the port frame is connected to the middle frame body is reduced, connection accuracy is improved, and subsequent processing and alignment are facilitated. In addition, the frame surface and the connection surface jointly increase a contact area between the port frame and the middle frame body, and improve electrical conductivity between the port frame and the middle frame body.

In an embodiment of the first aspect, strength of the frame body is greater than strength of the middle frame body. In this way, the strength of the frame body is greater than strength of a beam that uses a same material as the middle frame body. Under a condition of a slim and lightweight design, a risk that the port frame cracks can be reduced in a use scenario of a user such as a plurality of times of insertion and removal or dropping with a wire connected.

In an embodiment of the first aspect, the frame body is a frame body formed through injection molding of metal powder, to ensure strength of the frame body under the condition of the slim and lightweight design.

In an embodiment of the first aspect, the connection bump has an edge surface facing away from the connection surface, a connection hole penetrating the connection surface and the edge surface is provided on the connection bump, and the connection bump is fixedly connected to the middle frame body through the connection hole. A locking member of the middle frame component may be inserted into the connection hole, to lock the connection bump to the middle frame body by using the locking member.

In an embodiment of the first aspect, the connection bump protrudes from the frame surface and avoids a portion of the frame surface, the connection surface is connected to the frame surface and is perpendicular to the frame surface, the edge surface is parallel to the connection surface to facilitate processing, and the edge surface is flush with an edge of the frame surface, so that a connection location can be thinned while aesthetic can be kept.

In an embodiment of the first aspect, the frame body includes a frame member, and the frame member includes a first beam, a first connection beam, a second beam, and a second connection beam that are connected end-to-end to form the frame hole through enclosure, the first beam is parallel to the second beam and is spaced apart from the second beam, and an extension length of the first beam and an extension length of the second beam are both greater than a distance between the first beam and the second beam. In this way, a hole that extends in a strip shape is formed as the frame hole, to facilitate insertion of an electrical connection plug. The first connection beam has the frame surface, the frame surface is located on an extension path of the first beam, and the connection bump is located on an extension path of the second beam and protrudes from the frame surface in an extension direction of the second beam. In this case, the connection bump and the first connection beam jointly form an L-shaped structure.

In an embodiment of the first aspect, the frame body further includes a mounting member connected to the frame member and electrically connected to the frame member, the mounting member protrudes from the frame member in an extension direction of a central axis of the frame hole, and the mounting member is configured to be electrically connected to a motherboard of the electronic device. The mounting member extends toward the motherboard, to be closer to the motherboard, so that it is convenient to electrically connect the motherboard to the port frame.

In an embodiment of the first aspect, the mounting member includes a mounting part connected to the frame member and a boss part connected to an end of the mounting part away from the frame member, the boss part has a mounting surface facing away from the frame member, an area of the mounting surface is greater than a cross-sectional area that is of the mounting part and that is perpendicular to the central axis of the frame hole, and the mounting surface is used for mounting an electrical connection reed that is electrically connected to the motherboard. Disposing of the boss part increases the area of the mounting surface, to provide larger mounting space and a larger contact area for the electrical connection reed, thereby improving electrical conductivity between the electrical connection reed and the port frame.

In an embodiment of the first aspect, two mounting members are disposed, and the two mounting members are respectively connected to a same side of the first connection beam and the second connection beam and extend in a same direction. The two mounting members are disposed to mount two electrical connection reeds, to increase electrical connection locations between the port frame and the motherboard.

In an embodiment of the first aspect, the port frame further includes a positioning structure disposed on the frame body, and the positioning structure is configured to be adaptively connected to a connected-material structure connected to the middle frame body. Disposing of the positioning structure further improves alignment accuracy between the port frame and the middle frame body, and reduces a connection error.

In an embodiment of the first aspect, the positioning structure includes at least one positioning bump protruding from the frame body, and the positioning bump is adaptively engaged with the connected-material structure. The port frame can be positioned through adaptive engagement between the positioning bump and the connected-material structure.

In an embodiment of the first aspect, the positioning bump includes a rod-shaped part and a positioning part, the rod-shaped part protrudes from the frame body, the positioning part is connected to an end of the rod-shaped part away from the frame body and extends toward a side surface of the rod-shaped part, and at least the positioning part is capable of being adaptively engaged with a positioning slot on the connected-material structure. Disposing of the positioning part can limit sliding of the positioning bump in the positioning slot.

In an embodiment of the first aspect, the rod-shaped part and the positioning part jointly form a T-shape, to facilitate processing.

In an embodiment of the first aspect, the positioning structure includes two positioning bumps, and the two positioning bumps are respectively located on two opposite sides of the frame hole. In this way, the port frame can be positioned simultaneously by using the two positioning bumps, thereby further improving alignment accuracy.

According to a second aspect, a middle frame component is provided, including a middle frame body and the port frame described in some of the foregoing embodiments. The middle frame body has an edge part, the edge part has a first middle frame surface and a second middle frame surface that are connected to each other and disposed with an included angle therebetween, the frame surface is configured to come into contact with the first middle frame surface, the connection surface is in contact with the second middle frame surface, and the connection bump is fixedly connected to and electrically connected to the edge part. The port frame is disposed in the middle frame component, so that structural stability is improved, to facilitate connection accuracy with another structure.

In an embodiment of the second aspect, the middle frame component further includes an electrical connection reed connected to the frame body, and the electrical connection reed is configured to be electrically connected to the motherboard of the electronic device. The port frame is electrically connected to the motherboard by using the electrical connection reed, so that performance of an electrical connection between the port frame and the motherboard can be improved.

In an embodiment of the second aspect, two electrical connection reeds are disposed, and the two electrical connection reeds are respectively located on two opposite sides of the frame hole. Disposing of the two electrical connection reeds can enable the port frame to be electrically connected to a plurality of locations on the motherboard.

In an embodiment of the second aspect, at least one of the two electrical connection reeds is plate-shaped, and/or at least one of the two electrical connection reeds is L-shaped. The L-shaped electrical connection reeds can make the electrical connection reeds more adaptive to the motherboard. An extension length and an extension direction of the electrical connection reed may be set based on a location of a spring tab on the motherboard.

In an embodiment of the second aspect, a connection hole is provided on the connection bump, a mounting hole is provided on the edge part, the middle frame component further includes a locking member, and the locking member penetrates the mounting hole and the connection hole, and is configured to fixedly connect the connection bump to the edge part. In this way, the connection bump may be fixedly connected to the middle frame body by using the locking member, so that structural stability is high.

In an embodiment of the second aspect, the locking member is a rivet, and the rivet is circumferentially smooth, to facilitate riveting; the locking member is a screw, to fixedly connect the connection bump and the edge part by using the screw; or the locking member is a rivet, and there is a knurled structure in a circumference of the rivet, so that the locking member is more tightly connected to the connection bump and the edge part.

In an embodiment of the second aspect, the middle frame component further includes a wrapping member that is wrapped outside the port frame and at least a portion of the middle frame body, so that the wrapping member can enable the port frame and the edge part to form an integral part, thereby playing a protection function.

In an embodiment of the second aspect, the port frame further includes a positioning structure connected to the frame body, the middle frame component further includes a connected-material structure connected to the middle frame body, and the connected-material structure is adaptively connected to the positioning structure, to further improve positioning accuracy between the port frame and the middle frame body.

According to a third aspect, an electronic device is provided, and includes the middle frame component described in some of the foregoing embodiments. Structural strength of the electronic device is improved because the middle frame component is disposed, so that implementation of a slim and lightweight design is facilitated, and connection accuracy between components is higher.

DESCRIPTIONS OF REFERENCE NUMERALS

Figure 1:
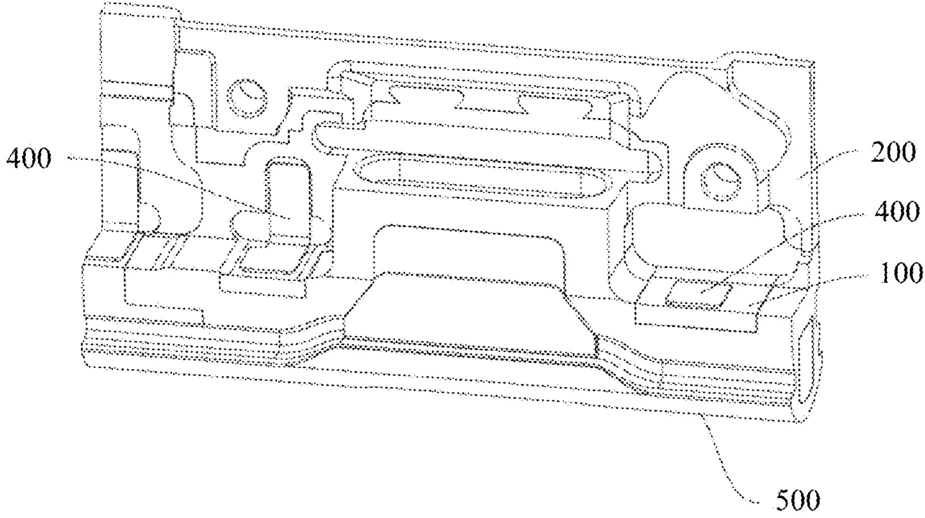
FIG. 1 is a diagram of a partial structure of a middle frame component according to an embodiment of this application.

100. port frame; 10. frame body; 101. frame hole; 102. frame surface; 11. frame member; 111. first beam; 112. first connection beam; 113. second beam; 114. second connection beam; 12. mounting member; 120. mounting surface; 121. mounting part; 122. boss part; 20. connection bump; 201. connection surface; 202. connection hole; 203. edge surface; 204. connection end surface; 30. positioning structure; 31. positioning bump; 311. rod-shaped part; 312. positioning part; 200. middle frame body; 2001. first middle frame surface; 2002. second middle frame surface; 2003. edge end surface; 2004. mounting hole; 210. body part; 220. edge part; 300. locking member; 400. electrical connection reed; 500. wrapping member; 600. connected-material structure; and 601. positioning slot.

DETAILED DESCRIPTION OF ILLUSTRATIVE EMBODIMENTS

Embodiments of this application are described in detail below, and examples of the embodiments are shown in the accompanying drawings, where the same or similar reference numerals always indicate the same or similar elements or elements having the same or similar functions. Embodiments described below with reference to the accompanying drawings are examples, and are intended to explain this application and cannot be construed as a limitation on this application.

In the description of this application, it should be understood that an orientation or a location relationship indicated by the terms "inside" and "outside", or the like is an orientation or a location relationship shown in the accompanying drawings, and is merely intended to facilitate description of this application and simplify description, but is not intended to indicate or imply that a specified apparatus or element must have a specific orientation, be constructed in a specific orientation, or operate in a specific orientation. Therefore, this cannot be construed as a limitation on this application.

To clearly describe the technical solutions in embodiments of this application, in embodiments of this application, words such as "first" and "second" are used to distinguish between same items or similar items with basically the same functions and effects. For example, a first limiting part and a second limiting part are merely intended to distinguish between different limiting parts, but not to limit a sequence of the limiting parts. A person skilled in the art may understand that the words such as "first" and "second" do not limit a quantity or an execution sequence, and the words such as "first" and "second" do not define a definite difference.

It should be noted that, in this application, words such as "in an embodiment" or "for example" are used to represent giving an example, an illustration, or a description. Any embodiment or design solution described as "in an embodiment" or "for example" in this application should not be construed as being preferred or advantageous over other embodiments or design solutions. Exactly, use of the words "in an embodiment" or "for example" is intended to present a related concept in a specific manner.

In this application, unless otherwise clearly specified and limited, the terms such as "interconnection" and "connection" are intended to be understood in a broad sense. For example, the "connection" may be a fixed connection, a removable connection, or an integral connection; may be a mechanical connection or an electrical connection; may be a direct connection or an indirect connection via a medium; or may be communication inside two elements or an interactive relationship between two elements. A person of ordinary skill in the art may understand specific meanings of the foregoing terms in this application based on specific cases.

To make the objectives, technical solutions, and advantages of this application clearer, the following further describes this application in detail with reference to the accompanying drawings and embodiments.

As a new breakthrough of a high-end mobile phone, a foldable-screen mobile phone is being accepted by increasingly more consumers due to advantages such as a larger screen, a more flexible viewing angle, more diversified use experience, and higher office efficiency, and gradually becomes a new trend.

A middle frame component of the foldable-screen mobile phone includes a middle frame body and a port frame, and a USB plug may be inserted into a frame hole enclosed by the port frame, so that the USB plug is electrically connected to a motherboard in the foldable-screen mobile phone. Currently, the middle frame component is usually disposed through integral injection molding of the middle frame body and the port frame, to facilitate processing. However, with diversity of functions of the foldable-screen mobile phone, to implement some functions or features of the port frame, the port frame usually needs to be separately processed, and then the port frame and the middle frame body are assembled. However, in this way, a problem of a large connection error between the port frame and the middle frame body is easily caused, and subsequent processing and alignment are affected.

In addition, currently, innovation and breakthrough for the foldable-screen mobile phone are generally concentrated on technologies such as a flexible screen design, a hinge design, and an industrial design. However, a problem of a thick and heavy body of the foldable-screen mobile phone has not been effectively resolved, and is often criticized by consumers. Therefore, a slim and lightweight design for the foldable-screen mobile phone has become a main battleground for various mobile phone manufacturers, and can be called the "last kilometer" of the foldable-screen mobile phone. However, just like the two sides of a coin, reducing thickness and weight inevitably brings significant risks and challenges to structural strength of the entire device. Development of a new material and a process is urgently needed. However, a current integrally formed middle frame component is mainly made of a metal material such as die-cast aluminum, profiled aluminum, or die-cast magnesium, and has relatively low strength. In a solution for thinning a structure of the entire foldable-screen mobile phone, because a size of a frame hole formed by a port frame is limited to a size of a normalized component, it is difficult to reduce the frame hole. Therefore, to thin the port frame, the structure of the entire foldable-screen mobile phone can only be reduced by reducing widths of beams on two sides of the port frame, to further reduce a cross-sectional area of the port frame. However, this further deteriorates structural strength of the port frame, and significantly increases a risk that the two beams crack.

To resolve the foregoing technical problem, embodiments of this application provide a port frame, a middle frame component, and an electronic device. The electronic device includes a housing, a middle frame component, and a motherboard. The middle frame component is mounted on the housing, and the motherboard is mounted on a middle frame, and is located in an inner cavity of the housing. The middle frame component includes a middle frame body and a port frame, and a frame hole is provided on the port frame. The frame hole may be used for mounting an electrical connection socket, for example, for insertion of a socket for a USB series, an audio socket, a headset socket, or an HDMI (High Definition Multimedia, high definition multimedia) socket; may be used for sound input or sound output, for example, may be a microphone micro-hole or an earpiece micro-hole; or may be used for mounting a structural member, for example, mounting a power member or a volume key. In embodiments of this application, a connection error between the port frame and the middle frame body is smaller, and connection accuracy is higher, so that subsequent processing and alignment are facilitated. In addition, structural strength of the port frame is higher, and a risk of cracking after a slim and lightweight design can be better prevented.

The foregoing electronic device may be an electronic device that needs to implement a slim and lightweight design, and includes but is not limited to a mobile phone, a notebook computer, a portable Android device (Portable Android Device, PAD), a netbook, an intelligent wearable device, an electronic reader, a calculator, an unmanned aerial vehicle, a VR (Virtual Reality, virtual reality)/AR (Augmented Reality, augmented reality) device, a smart home appliance, and a smart in-vehicle device.

Figure 2:
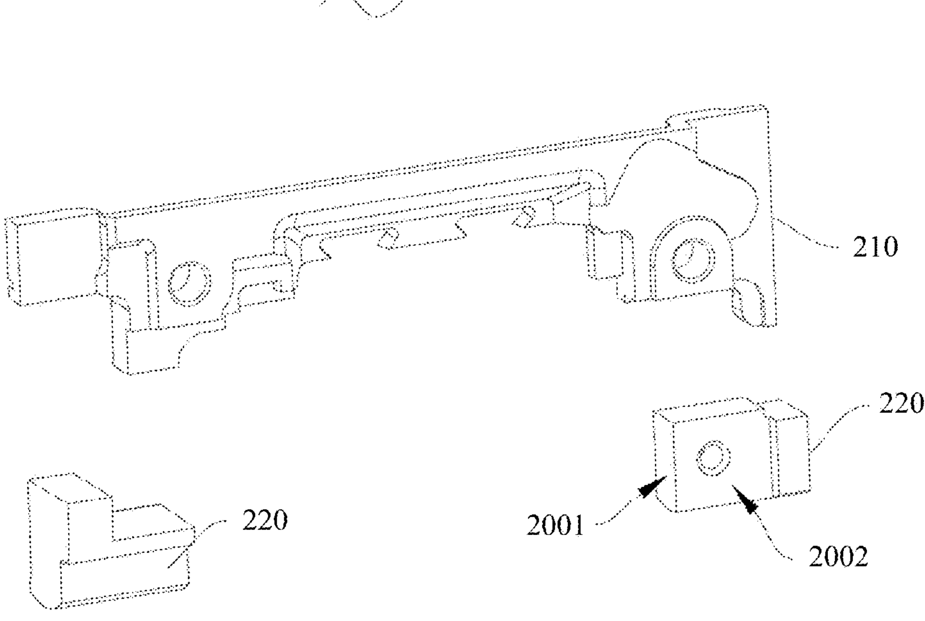
FIG. 2 is a diagram of a partial structure of a middle frame body according to an embodiment of this application.

In the following embodiments, a mobile phone is used as an example of the electronic device for description. The mobile phone includes but is not limited to a tablet mobile phone and a foldable-screen mobile phone (for example, a mobile phone with an inward foldable screen, a mobile phone with an outward foldable screen, or a flip mobile phone). The electronic device includes a middle frame component and a motherboard. As shown in FIG. 1, the middle frame component includes a middle frame body 200, a port frame 100, and a wrapping member 500. The port frame 100 is fixedly connected to the middle frame body 200, the motherboard is mounted on the middle frame body 200, and the port frame 100 is connected to an edge of the middle frame body 200, and is electrically connected to both the middle frame body 200 and the motherboard. The wrapping member 500 is wrapped outside the port frame 100 and at least a portion of the middle frame body 200, to insulate and protect the port frame 100 and the middle frame body 200. The port frame 100 may have a specific antenna function. As shown in FIG. 2, the middle frame body 200 has a first middle frame surface 102 and a second middle frame surface 2002, and a first middle frame surface 2001 and the second middle frame surface 2002 are disposed with an included angle therebetween, that is, the included angle between the first middle frame surface 2001 and the second middle frame surface 2002 is greater than 0° and less than 180°. The first middle frame surface 2001 and the second middle frame surface 2002 may be connected to each other, or may be spaced apart.

Figure 3:
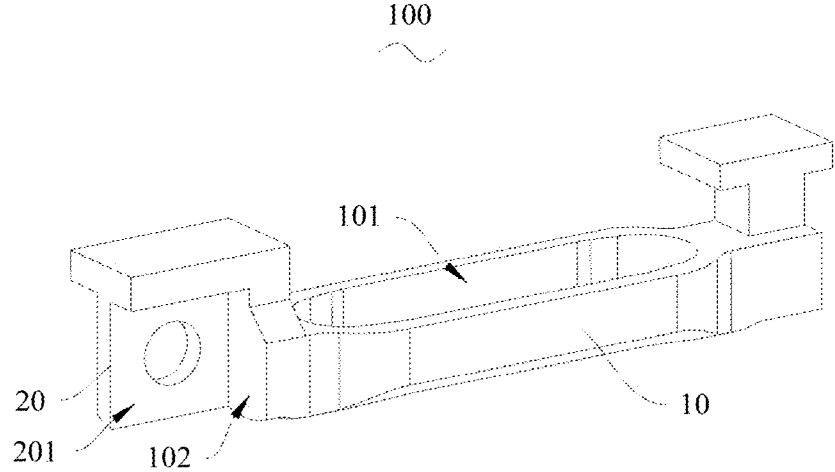
FIG. 3 shows a port frame according to an embodiment of this application.

As shown in FIG. 3, the port frame 100 provided in this application includes a frame body 10 and at least one connection bump 20.

A frame hole 101 is formed on the frame body 10, and the frame body 10 has a frame surface 102. The connection bump 20 is connected to the frame body 10, the connection bump 20 has a connection surface 201, and the frame surface 102 and the connection surface 201 are disposed with an included angle therebetween.

Figure 4:
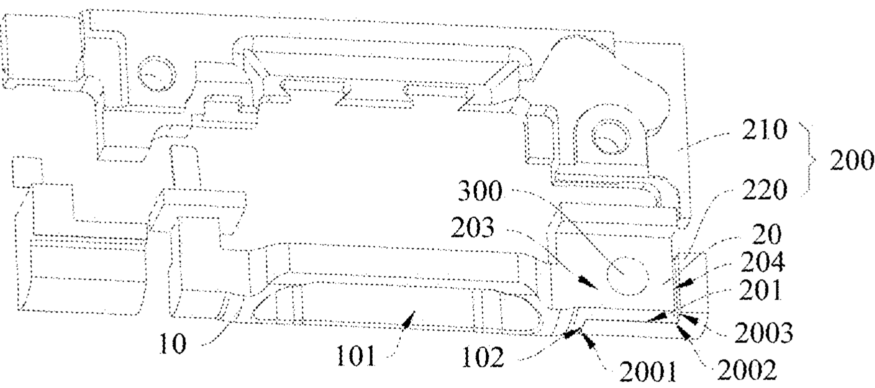
FIG. 4 is a diagram of a partial structure of the middle frame component in FIG. 1 from another perspective, where a wrapping member is not shown.

As shown in FIG. 4, the frame surface 102 is configured to come into contact with the first middle frame surface 2001, and the connection surface 201 is configured to come into contact with the second middle frame surface 2002. To be specific, a sum of the included angle between the connection surface 201 and the frame surface 102 and the included angle between the first middle frame surface 2001 and the second middle frame surface 2002 is 360°.

The connection bump 20 is fixedly connected to the middle frame body 200, and a fixedly connecting manner includes but is not limited to a screw connection, riveting, engaging, welding, and the like. The connection bump 20 is electrically connected to both the frame body 10 and the middle frame body 200, to electrically conduct the frame body 10 and the middle frame body 200, so that an antenna function of the port frame 100 is met. It should be noted that the middle frame body 200, the frame body 10, and the connection bump 20 are all made of a conductive material. The frame body 10 and the connection bump 20 may be integrally formed to facilitate processing. In this case, a material of the port frame 100 and a material of the middle frame body 200 may be the same or different, and this is not limited herein.

The port frame 100 is aligned with the middle frame body 200 through contact between the frame surface 102 and the first middle frame surface 2001 and contact between the connection surface 201 and the second middle frame surface 2002. Therefore, a connection error caused when the port frame 100 is connected to the middle frame body 200 is reduced, connection accuracy is improved, and subsequent processing and alignment are facilitated. In addition, the frame surface 102 and the connection surface 201 jointly increase a contact area between the port frame 100 and the middle frame body 200, and improve electrical conductivity between the port frame 100 and the middle frame body 200.

Figure 5:
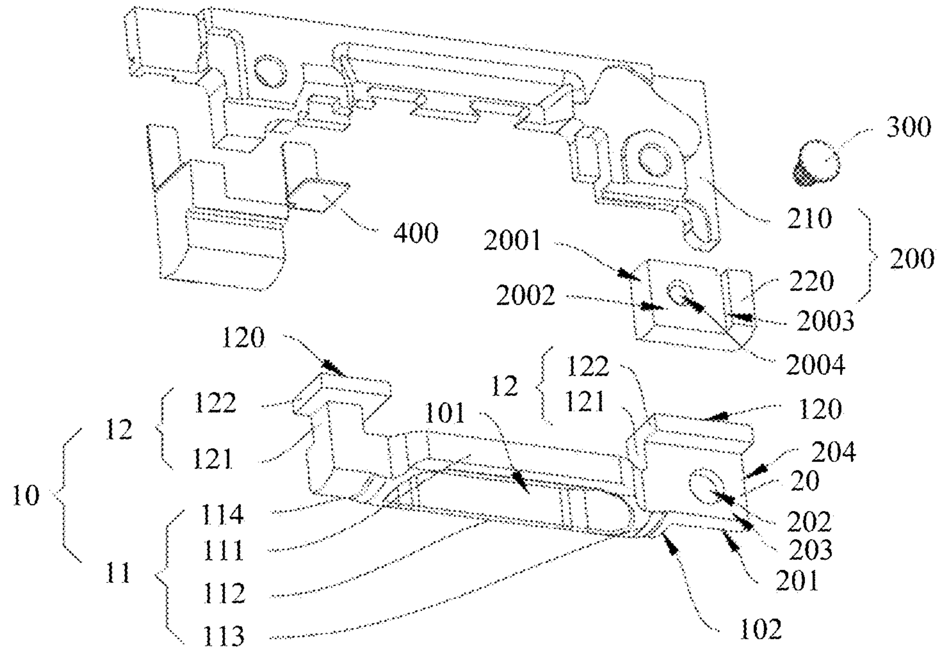
FIG. 5 is an exploded view of the middle frame component in FIG. 4.

Specifically, as shown in FIG. 4 and FIG. 5, the middle frame body 200 includes a body part 210 and an edge part 220 connected to the body part 210, and both the first middle frame surface 2001 and the second middle frame surface 2002 are located on the edge part 220. The body part 210 and the edge part 220 are integrally formed, and are both made of a conductive material, for example, a metal material such as die-cast aluminum, profiled aluminum, or die-cast magnesium.

The first middle frame surface 2001 is connected to the second middle frame surface 2002, the first middle frame surface 2001 is perpendicular to the second middle frame surface 2002, and the included angle between the first middle frame surface 2001 and the second middle frame surface 2002 may be 270°. It should be noted that the included angle between the first middle frame surface 2001 and the second middle frame surface 2002 is an included angle between an orientation of the first middle frame surface 2001 and an orientation of the second middle frame surface 2002.

The connection bump 20 protrudes from the frame surface 102, and avoids a portion of the frame surface 102. The connection surface 201 is connected to the frame surface 102, and is perpendicular to the frame surface 102. The included angle between the connection surface 201 and the frame surface 102 is 90°. In this case, the connection surface 201 and the frame surface 102 jointly form an L-shaped surface, and the L-shaped surface matches an L-shaped surface including the first middle frame surface 2001 and the second middle frame surface 2002. This not only facilitates processing of the port frame 100, but also facilitates quick alignment between the connection bump 20 and the middle frame body 200.

To increase a contact area between the connection bump 20 and the middle frame body 200, the connection surface 201 may face a thickness direction of the middle frame body 200. The frame surface 102 and the connection surface 201 may each be a plane, or at least one of the frame surface 102 and the connection surface 201 may be an arc surface or a folded surface, to improve alignment accuracy.

The connection bump 20 has an edge surface 203 and a connection end surface 204, the edge surface 203 faces away from the connection surface 201, and the connection end surface 204 is located at an end of the connection bump 20 away from the middle frame body 200, and is connected to the edge surface 203 and the connection surface 201. The edge surface 203 may be parallel to the connection surface 201, and the connection end surface 204 may be perpendicular to both the edge surface 203 and the connection surface 201, to facilitate processing. The edge surface 203 may be flush with an edge of the frame surface 102, to avoid a larger portion of the frame surface 102, so that a contact area between the frame surface 102 and the first middle frame surface 2001 is increased.

Optionally, an extension end of the edge part 220 has an edge end surface 2003, the first middle frame surface 2001 is formed on the edge end surface 2003, an edge groove is provided on the edge part 220 on a side on which the edge end surface 2003 is located, and the second middle frame surface 2002 is formed on a groove sidewall surface that is of the edge groove and that is connected to the first middle frame surface 2001. To further improve stability of a connection between the connection bump 20 and the edge part 220, the connection end surface 204 of the connection bump 20 may abut against a groove bottom surface of the edge groove.

Certainly, in another embodiment, the connection bump 20 may be alternatively disposed in a middle portion of the frame surface 102, and the edge surface 203 is connected to the frame surface 102. In this case, a third middle frame surface may be further disposed on the edge part 220 of the middle frame body 200 to come into contact with the edge surface 203, to further improve alignment accuracy. For example, the edge groove is provided in a middle portion of an end surface of the edge part 220. In this case, the third middle frame surface is formed on a groove sidewall surface that is of the edge groove and that is located on an opposite side of the second middle frame surface 2002.

In some embodiments, two connection bumps 20 may be disposed, both the two connection bumps 20 are connected to the frame body 10, and both the two connection bumps 20 are configured to be fixedly connected to the middle frame body 200. In this way, the frame body 10 can be connected to the middle frame body 200 by using the two connection bumps 20, thereby increasing connection locations, and improving strength of a connection between the frame body 10 and the middle frame body 200. The two connection bumps 20 may be respectively disposed on two opposite sides of the frame body 10, to improve connection stability. The two connection bumps 20 may be of a same structure or different structures. Both the two connection bumps 20 may be configured to be aligned with the middle frame body 200, or only one of the two connection bumps 20 may be used for alignment. Both the two connection bumps 20 may be configured to be fixedly connected to the middle frame body 200, or only one of the two connection bumps 20 may be fixedly connected to the middle frame body 200. Details are not described herein. In the following embodiments, as an example for description, only one connection bump 20 is disposed.

The connection bump 20 may be fixedly connected to the edge part 220. In this way, alignment and fastening of the port frame 100 may be performed at a same location, thereby facilitating operations.

In an implementation, as shown in FIG. 5, a connection hole 202 penetrating the connection surface 201 and the edge surface 203 is provided on the connection bump 20. A direction of providing the connection hole 202 is a thickness direction of the middle frame body 200, and the connection bump 20 is fixedly connected to the middle frame body 200 through the connection hole 202.

For example, a mounting hole 2004 is provided on the edge part 220, and a direction of providing the mounting hole 2004 is the thickness direction of the middle frame body 200. When the frame surface 102 is in contact with the first middle frame surface 2001 and the connection surface 201 is in contact with the second middle frame surface 2002, the mounting hole 2004 is directly opposite to the connection hole 202. The middle frame component further includes a locking member 300. The locking member 300 penetrates the mounting hole 2004 and the connection hole 202, and is configured to fixedly connect the connection bump 20 to the edge part 220. In this case, the connection bump 20 and the edge part 220 are fixedly connected by using the locking member 300. The locking member 300 is made of a conductive material, to improve performance of an electrical connection between the edge part 220 and the connection bump 20. Both the mounting hole 2004 and the connection hole 202 may be through holes, or one of the mounting hole 2004 and the connection hole 202 may be a blind hole, provided that the locking member 300 can be inserted into the mounting hole 2004 and the connection hole 202.

Optionally, the locking member 300 is a rivet, and the rivet may pass through the connection hole 202 from a side on which the edge surface 203 is located, and may be riveted into the mounting hole 2004. At least a cap portion of the rivet may be accommodated in the connection hole 202, to reduce a thickness of the middle frame body 200 in this portion after the locking member 300 is connected. The rivet may be circumferentially smooth, to facilitate riveting. Alternatively, a knurled structure may be disposed in a circumference of the rivet, and the knurled structure can be in interference fit with at least one of the mounting hole 2004 and the connection hole 202 during riveting of the rivet, and match the mounting hole 2004 or the connection hole 202 more closely through deformation of the knurled structure, thereby improving stability of connections between the rivet and the connection bump 20 and between the rivet and the edge part 220. Certainly, in another embodiment, the rivet may be alternatively riveted into the connection hole 202 through the mounting hole 2004. Details are not described herein.

Optionally, the locking member 300 is a screw, and the screw may pass through the connection hole 202 from a side on which the edge surface 203 is located, and is screwed to the mounting hole 2004. At least a cap portion of the screw may be accommodated in the connection hole 202, to reduce a thickness of the middle frame body 200 in the portion after the locking member 300 is connected. Internal threads may be disposed in both the connection hole 202 and the mounting hole 2004. In this case, the screw may also be screwed to and match the connection hole 202, to improve stability of a connection between the screw and the connection bump 20. Certainly, in another embodiment, the screw may be alternatively screwed into the connection hole 202 through the mounting hole 2004. Details are not described herein.

As shown in FIG. 5, in an embodiment shown in the figure, a direction of providing the frame hole 101 faces the body part 210 of the middle frame body 200. The frame hole 101 is used for mounting an electrical connection socket, for example, for insertion of a socket for a USB series, an audio socket, and a headset socket.

For example, the frame hole 101 is used for insertion of the socket for the USB series. The frame body 10 may be sleeved outside the socket for the USB series and is electrically connected to the socket for the USB series. The socket for the USB series may include a USB-type-B port or a USB-type-C port. In this case, the frame hole 101 is in a strip shape.

As shown in FIG. 5, the frame body 10 includes a frame member 11 and a mounting member 12.

The frame member 11 includes a first beam 111, a first connection beam 112, a second beam 113, and a second connection beam 114 that are connected end-to-end, and the first beam 111, the first connection beam 112, the second beam 113, and the second connection beam 114 jointly form the frame hole 101 through enclosure. The first beam 111 is parallel to the second beam 113, and is spaced apart from the second beam 113. An extension length of the first beam 111 and an extension length of the second beam 113 are both greater than a distance between the first beam 111 and the second beam 113. In this way, the frame hole 101 is in a strip shape. The first beam 111 and the second beam 113 extend in a length direction of the frame hole 101.

The first connection beam 112 has the frame surface 102 of the frame body 10, and the frame surface 102 is located on an extension path of the first beam 111, that is, the frame surface 102 is located on a side of the first connection beam 112 facing away from a central axis of the frame hole 101, and the first middle frame surface 2001 is located on the extension path of the first beam 111. The connection bump 20 is located on an extension path of the second beam 113, and protrudes from the frame surface 102 in an extension direction of the second beam 113, that is, the connection bump 20 is connected to a side that is of the first connection beam 112 and that is close to the second beam 113. A thickness of the first connection beam 112 and a thickness of the second connection beam 114 are both greater than a thickness of the first beam 111 and a thickness of the second beam 113, to improve structural strength of the frame member 11.

Both the first beam 111 and the second beam 113 may extend in a straight line. The first beam 111 may be connected to each of the first connection beam 112 and the second connection beam 114 by using a bending part. The second beam 113 may be connected to each of the first connection beam 112 and the second connection beam 114 by using a bending part. In this case, both the first beam 111 and the second beam 113 protrude from the first connection beam 112 and the second connection beam 114 in the thickness direction of the middle frame body 200, so that the thickness of the first connection beam 112 and the thickness of the second connection beam 114 are thinner. It should be noted that the thickness of the first beam 111, the thickness of the second beam 113, the thickness of the first connection beam 112, and the thickness of the second connection beam 114 are thicknesses in the thickness direction of the middle frame body 200.

The mounting member 12 is connected to the frame member 11, and is electrically connected to the frame member 11. The mounting member 12 is configured to be electrically connected to the motherboard of the electronic device. The mounting member 12 protrudes from the frame member 11 in an extension direction of the central axis of the frame hole 101. It may be understood that the frame member 11 has an inner side surface and an outer side surface that face away from each other. The inner side surface and the outer side surface are arranged in the extension direction of the central axis of the frame hole 101, that is, the frame hole 101 penetrates the inner side surface and the outer side surface. The inner side surface faces the body part 210 of the frame body 10, and the outer side surface faces away from the body part 210. The body part 210 is spaced apart from the frame member 11, the motherboard of the electronic device is connected to the body part 210, and the mounting member 12 protrudes from the inner side surface, to be closer to the motherboard. Therefore, it is more convenient to implement an electrical connection between the port frame 100 and the motherboard. The mounting member 12 may be disposed on the inner side surface, and may be connected to the first connection beam 112 or the second connection beam 114, so that it is convenient to set a larger thickness to improve structural strength.

Optionally, two mounting members 12 are disposed, and the two mounting members 12 are respectively connected to a same side of the first connection beam 112 and the second connection beam 114, and extend in a same direction. In other words, one mounting member 12 protrudes from an inner side surface of the first connection beam 112, and the other mounting member 12 protrudes from an inner side surface of the second connection beam 114. In this way, the port frame 100 can be electrically connected to the motherboard by using the two mounting members 12, to increase a quantity of electrical connection locations. The mounting member 12 connected to the first connection beam 112 may also be connected to the connection bump 20, to increase a configurable width of the mounting member 12 in the extension direction of the frame hole 101. Alternatively, the mounting member 12 may be directly connected to only a connection bump, and is connected to the first connection beam 112 by using the connection bump.

Figure 6:
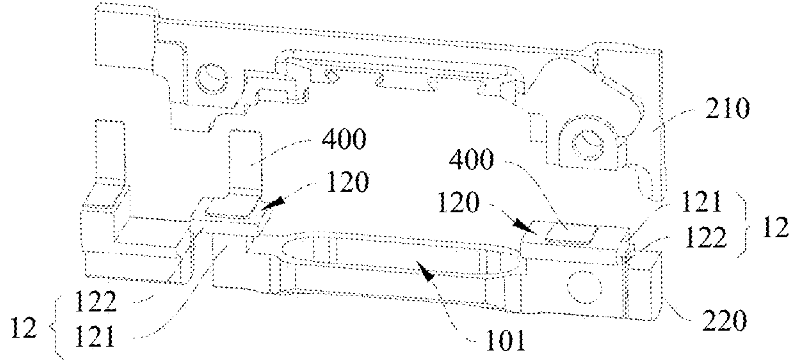
FIG. 6 is a diagram of a partial structure of the middle frame component in FIG. 4 from still another perspective.

As shown in FIG. 6, the mounting member 12 has a mounting surface 120 facing away from the frame member 11. The mounting surface 120 may be used for mounting an electrical connection reed 400 that is electrically connected to the motherboard, and the electrical connection reed 400 is electrically conductive to the mounting member 12. In this way, the mounting member 12 is electrically connected to the motherboard by using the electrical connection reed 400. Disposing of the electrical connection reed 400 can reduce resistance between the port frame 100 and the motherboard, and improve electrical conductivity between the port frame 100 and the motherboard. The electrical connection reed 400 may be electrically connected to the motherboard by abutting against a spring tab on the motherboard.

Optionally, the mounting member 12 includes a mounting part 121 and a boss part 122. The mounting part 121 is connected to the frame member 11, and is specifically connected to and protrudes from the inner side surface, and the boss part 122 is connected to an end of the mounting part 121 away from the frame member 11. The boss part 122 has the foregoing mounting surface 120, and an area of the mounting surface 120 is greater than a cross-sectional area that is of the mounting part 121 and that is perpendicular to the central axis of the frame hole 101. In other words, the boss part 122 protrudes from a side surface of the mounting part 121, to increase the area of the mounting surface 120, thereby increasing a contact area with the electrical connection reed 400, so that electrical conductivity between the mounting member 12 and the electrical connection reed 400 is further improved.

Optionally, the electrical connection reed 400 may be alternatively plate-shaped, and is in contact with the mounting surface 120, and then is fixedly connected to and electrically conductive to the mounting member 12 through spot welding. The electrical connection reed 400 may alternatively have a bent section, and the bent section may extend toward the motherboard, so that the electrical connection reed 400 can be electrically connected to spring tabs at different locations on the motherboard, thereby improving adaptability of the electrical connection reed 400. The electrical connection reed 400 that has the bent section may be L-shaped, to facilitate processing.

When two mounting members 12 are disposed, the mounting surface 120 may be disposed on both the two mounting members 12, and both the two mounting members 12 are electrically connected to the electrical connection reeds 400 by using the mounting surface 120. Structures of the two electrical connection reeds 400 may be the same or may be different. In the embodiment shown in the figure, a plate-shaped electrical connection reed 400 is connected to one mounting member 12, and an L-shaped electrical connection reed 400 is mounted on the other mounting member 12. In another embodiment, the plate-shaped electrical connection reed 400 may be disposed on each of the two mounting members 12, or the L-shaped electrical connection reed 400 is disposed on each of the two mounting members 12, or the electrical connection reed 400 is disposed on only one of the two mounting members 12.

Certainly, in another embodiment, alternatively, the mounting member 12 may not be disposed on the frame body 10, but only the frame member 11 is disposed. The mounting surface 120 is located on the frame member 11, and the electrical connection reed 400 is also spot welded to the frame member 11. Details are not described herein.

In the foregoing embodiment, a frame body 10 whose strength is greater than that of the middle frame body 200 is selected for the port frame 100 in this application. In other words, strength of the frame body 10 is greater than strength of the middle frame body 200. In this way, strength of the first beam 111 and strength of the second beam 113 are higher than strength of a beam that uses a same material as the middle frame body 200, to reduce a risk that the port frame 100 cracks in a use scenario of a user such as a plurality of times of insertion and removal or dropping with a wire connected.

For example, the frame body 10 is a frame body 10 formed through injection molding of metal powder. Injection molding of metal powder (Metal injection Molding, MIM) is a molding method in which a plasticized mixture of metal powder and a binder of the metal powder is injected into a mold. In injection molding of metal powder, the selected powder is first mixed with the binder, and then the mixture is pelletized before injection molding, to form a required shape. A polymer imparts viscous flow characteristics of the polymer to the mixture, thereby contributing to uniformity of forming, mold cavity filling, and powder filling. After forming, the binder is removed, and then a degreased blank is sintered. Densification processing, heat treatment, or machining may need to be further performed on some sintered products. A frame body 10 sintered in this method has not only a complex shape and high precision that are the same as those of a product obtained by a plastic injection molding method, but also physical, chemical, and mechanical properties that are close to those of a forged piece. Specifically, the frame body 10 is formed through injection molding of stainless steel metal powder, to ensure strength of the frame body 10 under a condition of a slim and lightweight design, and costs of the stainless steel metal powder are relatively low.

In an injection molding process, the middle frame body 200 is usually connected to some internal structural members of the middle frame body 200 by using a connected-material structure 600, to position locations of the internal structural members. After final assembly is completed, the connected-material structure 600 is milled off through CNC (Computer numerical control, computer numerical control machine) to form the final middle frame body 200. In this embodiment, the connected-material structure 600 may be connected to the body part 210 of the middle frame body 200.

Figure 7:
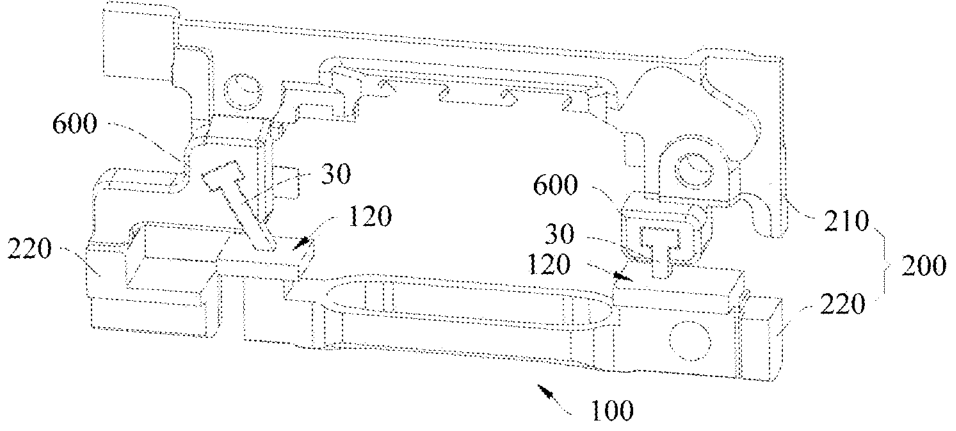
FIG. 7 is a diagram of a structure of the middle frame component in FIG. 6 during assembly.

As shown in FIG. 7, to further improve alignment accuracy between the port frame 100 and the middle frame body 200, the port frame 100 may further include a positioning structure 30, and the positioning structure 30 may be disposed on the frame body 10, and is configured to be adaptively connected to the connected-material structure 600 connected to the middle frame body 200. In this way, the port frame 100 can be aligned with the middle frame body 200 through positioning of three locations, that is, contact between the frame surface 102 and the first middle frame surface 2001 (with reference to FIG. 3), contact between the connection surface 201 and the second middle frame surface 2002 (with reference to FIG. 3), and an adaptive connection between the positioning structure 30 and the connected-material structure 600, thereby further reducing a connection error between the port frame 100 and the middle frame body 200. It should be noted that the foregoing adaptive connection includes but is not limited to engagement, abutment, insertion, and the like.

The positioning structure 30 may include a groove structure or a hole structure that is provided on the frame body 10, or may include a structural member that protrudes from the frame body 10. It should be noted that, when the positioning structure 30 includes the structural member that protrudes from the frame body 10, both the positioning structure 30 and the connected-material structure 600 are redundant structural members for assembling the electronic device. After alignment of the port frame 100 is completed, the positioning structure 30 and the connected-material structure 600 are milled off through CNC, and then another internal structural member is assembled.

Figure 8:
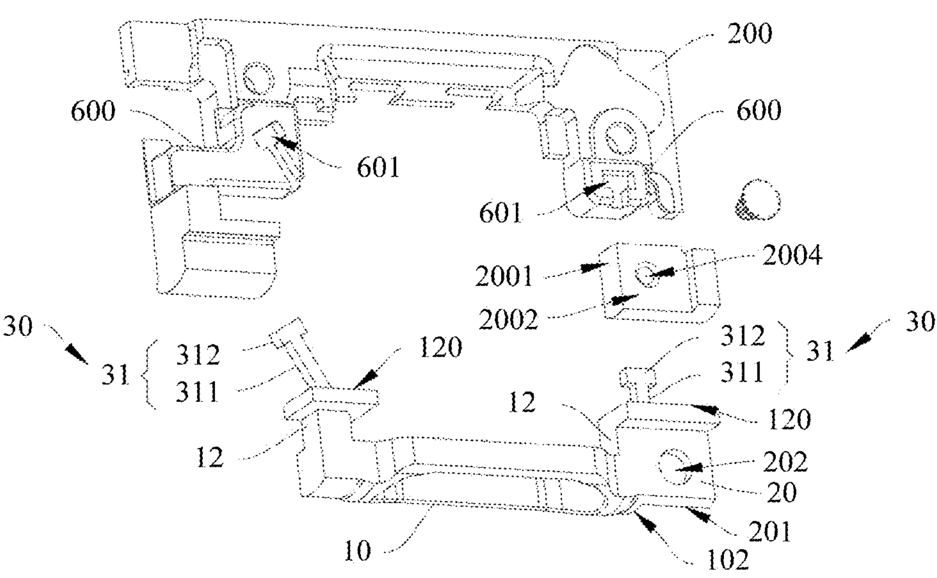
FIG. 8 is an exploded view of the middle frame component in FIG. 7.

For example, as shown in FIG. 8, the positioning structure 30 includes at least one positioning bump 31 that protrudes from the frame body 10, and the positioning bump 31 is adaptively engaged with the connected-material structure 600. Specifically, the positioning bump 31 may protrude from the mounting surface 120 of the mounting member 12, and extends toward the connected-material structure 600. A positioning slot 601 that matches the positioning bump 31 is disposed on the connected-material structure 600, and the positioning bump 31 may be adaptively engaged with the positioning slot 601 to implement positioning. An opening direction of the positioning slot 601 may be perpendicular to an orientation of the frame surface 102, to position the port frame 100 in different directions. In this embodiment, the opening direction of the positioning slot 601 may be the thickness direction of the middle frame body 200. During mounting, the positioning bump 31 may be clamped into the positioning slot 601 in the thickness direction of the middle frame body 200, so that the positioning bump 31 and the connected-material structure 600 are limited in one or more directions perpendicular to the thickness direction of the middle frame body 200. Then, the frame surface 102 is in contact with the first middle frame surface 2001, and the connection surface 201 is in contact with the second middle frame surface 2002, to finally align the port frame 100 with the middle frame body 200.

Optionally, the positioning bump 31 includes a rod-shaped part 311 and a positioning part 312. The rod-shaped part 311 protrudes from the frame body 10. The positioning part 312 is connected to an end of the rod-shaped part 311 away from the frame body 10 and extends toward a side surface of the rod-shaped part 311, and at least the positioning part 312 can be adaptively engaged with the positioning slot 601 on the connected-material structure 600. In other words, the positioning slot 601 on the connected-material structure 600 has at least a portion that matches the positioning part 312. In this way, after the positioning part 312 is engaged with the positioning slot 601, the positioning slot 601 can limit displacement of the positioning part 312 in any direction perpendicular to the thickness direction of the middle frame body 200, to prevent the positioning bump 31 from sliding in the positioning slot 601 in an extension direction of the positioning slot 601, thereby improving positioning accuracy.

For example, two ends of the positioning part 312 may respectively extend toward two side surfaces of the rod-shaped part 311 that face away from each other. In this case, the rod-shaped part 311 and the positioning part 312 jointly form a T-shape. Correspondingly, a cross-sectional shape of the positioning slot 601 on the connected-material structure 600 is also a T-shape. An extension direction of the positioning part 312 is perpendicular to the thickness direction of the middle frame body 200, so that an extension length of the positioning part 312 is not limited by a thickness of the electronic device. The T-shaped positioning bump 31 facilitates processing and alignment. In another embodiment, the positioning bump 31 may be alternatively L-shaped. This is not limited herein.

In the embodiment shown in the figure, the positioning structure 30 may include two positioning bumps 31. The two positioning bumps 31 are respectively located on two opposite sides of the frame hole 101, and both the two positioning bumps 30 can be adaptively connected to the connected-material structure 600, to further improve alignment accuracy. Specifically, the two positioning bumps 31 respectively protrude from mounting surfaces 120 of the two mounting members 12. Structures of the two positioning structures 30 may be completely the same or may be different, and may be specifically set based on a location and a structure of the connected-material structure 600.

It should be noted that, when the positioning structure 30 is disposed on the port frame 100, positioning may not be implemented through contact between the frame surface 102 and the first middle frame surface 2001 and/or contact between the connection surface 201 and the second middle frame surface 2002, but positioning is performed only by using the positioning structure 30. After the port frame 100 is positioned by using an adaptive connection between the positioning structure 30 and the connected-material structure 600, the connection hole 202 on the connection bump 20 may be directly opposite to the mounting hole 2004 on the middle frame body 200, so that it is convenient to insert the locking member 300 into the connection hole 202 and the mounting hole 2004. In this case, the frame surface 102 may be spaced apart from the first middle frame surface 2001, and/or the connection surface 201 may be spaced apart from the second middle frame surface 2002. An assembly tolerance distance between the connection surface 201 and the second middle frame surface 2002 can meet an antenna performance requirement.

During assembly of the middle frame component, the port frame 100 and the middle frame body 200 are first aligned through contact between the frame surface and the first middle frame surface 2001 and contact between the connection surface 201 and the second middle frame surface 2002 and/or the adaptive connection between the positioning structure 30 and the connected-material structure 600; then, the connection bump 20 is connected to the middle frame body 200 by using the locking member 300, to fixedly connect the port frame 100 to the middle frame body 200; then, the wrapping member 500 is wrapped outside the port frame 100, the edge part 220 of the middle frame body 200, and the locking member 300, where the wrapping member 500 avoids the mounting surface 120 of the port frame 100. In this way, the port frame 100, the edge part 220, and the locking member 300 are protected by the wrapping member 500, so that structural stability is improved. If the port frame 100 is positioned by using the positioning bump 31, the positioning bump 31 on the port frame 100 and the connected-material structure 600 connected to the middle frame body 200 need to be milled off through CNC, to present a flat mounting surface 120. Then, the electrical connection reed 400 is connected to the mounting surface 120, to electrically connect the electrical connection reed 400 to the port frame 100. In this case, the electrical connection reed 400 may be detected by using a conduction detector, to determine whether the port frame 100 is reliably electrically connected to the middle frame body 200. If a determining result is that a function is normal, it may be determined that the middle frame component is a qualified product. Then, the motherboard and the middle frame body 200 may be assembled next, and the electrical connection reed 400 is electrically connected to the spring tab on the motherboard.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A port frame, configured to be fixedly connected to a middle frame body of an electronic device, wherein the middle frame body has a first middle frame surface and a second middle frame surface disposed with an included angle therebetween, and the port frame comprises a frame body and at least one connection bump connected to the frame body;

a frame hole is formed on the frame body, the frame body has a frame surface, and the frame surface is configured to come into contact with the first middle frame surface; and the connection bump has a connection surface that forms an included angle with the frame surface, the connection surface is configured to come into contact with the second middle frame surface, the connection bump is fixedly connected to the middle frame body, and is electrically connected to both the frame body and the middle frame body.

2. The port frame according to claim 1, wherein strength of the frame body is greater than strength of the middle frame body.

3. The port frame according to claim 2, wherein the frame body is a frame body formed through injection molding of metal powder.

4. The port frame according to claim 1, wherein the connection bump has an edge surface facing away from the connection surface, a connection hole penetrating the connection surface and the edge surface is provided on the connection bump, and the connection bump is fixedly connected to the middle frame body through the connection hole.

5. The port frame according to claim 4, wherein the connection bump protrudes from the frame surface and avoids a portion of the frame surface, the connection surface is connected to the frame surface and is perpendicular to the frame surface, and the edge surface is parallel to the connection surface and is flush with an edge of the frame surface.

6. The port frame according to claim 1, wherein the frame body comprises a frame member, the frame member comprises a first beam, a first connection beam, a second beam, and a second connection beam that are connected end-to-end to enclose and form the frame hole, the first beam is parallel to the second beam and is spaced apart from the second beam, an extension length of the first beam and an extension length of the second beam are both greater than a distance between the first beam and the second beam, the first connection beam has the frame surface, the frame surface is located on an extension path of the first beam, and the connection bump is located on an extension path of the second beam and protrudes from the frame surface in an extension direction of the second beam.

7. The port frame according to claim 6, wherein the frame body further comprises a mounting member connected to the frame member and electrically connected to the frame member, the mounting member protrudes from the frame member in an extension direction of a central axis of the frame hole, and the mounting member is configured to be electrically connected to a motherboard of the electronic device.

8. The port frame according to claim 7, wherein the mounting member comprises a mounting part connected to the frame member and a boss part connected to an end of the mounting part away from the frame member, the boss part has a mounting surface facing away from the frame member, an area of the mounting surface is greater than a cross-sectional area that is of the mounting part and that is perpendicular to the central axis of the frame hole, and the mounting surface is used for mounting an electrical connection reed that is electrically connected to the motherboard.

9. The port frame according to claim 7, wherein two mounting members are disposed, and the two mounting members are respectively connected to a same side of the first connection beam and the second connection beam and extend in a same direction.

10. The port frame according to claim 1, wherein the port frame further comprises a positioning structure disposed on the frame body, and the positioning structure is configured to be adaptively connected to a connected-material structure connected to the middle frame body.

11. The port frame according to claim 10, wherein the positioning structure comprises at least one positioning bump protruding from the frame body, and the positioning bump is adaptively engaged with the connected-material structure.

12. The port frame according to claim 11, wherein the positioning bump comprises a rod-shaped part and a positioning part, the rod-shaped part protrudes from the frame body, the positioning part is connected to an end of the rod-shaped part away from the frame body and extends toward a side surface of the rod-shaped part, and at least the positioning part is capable of being adaptively engaged with a positioning slot on the connected-material structure.

13. The port frame according to claim 12, wherein the rod-shaped part and the positioning part jointly form a T-shape.

14. The port frame according to claim 11, wherein the positioning structure comprises two positioning bumps, and the two positioning bumps are respectively located on two opposite sides of the frame hole.

15. A middle frame component, comprising a middle frame body and the port frame according to claim 1, wherein the middle frame body has an edge part, the edge part has a first middle frame surface and a second middle frame surface that are connected to each other and disposed with an included angle therebetween, the frame surface is configured to come into contact with the first middle frame surface, the connection surface is in contact with the second middle frame surface, and the connection bump is fixedly connected to and electrically connected to the edge part.

16. The middle frame component according to claim 15, wherein the middle frame component further comprises an electrical connection reed connected to the frame body, and the electrical connection reed is configured to be electrically connected to the motherboard of the electronic device.

17. The middle frame component according to claim 16, wherein two electrical connection reeds are disposed, and the two electrical connection reeds are respectively located on two opposite sides of the frame hole.

18. The middle frame component according to claim 17, wherein at least one of the two electrical connection reeds is plate-shaped, and/or at least one of the two electrical connection reeds is L-shaped.

19. The middle frame component according to claim 15, wherein a connection hole is provided on the connection bump, a mounting hole is provided on the edge part, the middle frame component further comprises a locking member, and the locking member penetrates the mounting hole and the connection hole, and is configured to fixedly connect the connection bump to the edge part.

20. The middle frame component according to claim 19, wherein the locking member is a rivet, and the rivet is circumferentially smooth; the locking member is a screw; or the locking member is a rivet, and there is a knurled structure in a circumference of the rivet.

* * * * *